United States Patent
Pan et al.

(10) Patent No.: US 7,027,489 B2
(45) Date of Patent: *Apr. 11, 2006

(54) ITERATIVE FAST FOURIER TRANSFORM ERROR CORRECTION

(75) Inventors: Jung-Lin Pan, Selden, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 612 days.

This patent is subject to a terminal disclaimer.

(21) Appl. No.: 10/004,370

(22) Filed: Nov. 1, 2001

(65) Prior Publication Data

US 2002/0191577 A1 Dec. 19, 2002

Related U.S. Application Data

(60) Provisional application No. 60/282,387, filed on Apr. 6, 2001.

(51) Int. Cl.
*H04B 1/69* (2006.01)

(52) U.S. Cl. .................. 375/147; 375/148; 375/340

(58) Field of Classification Search ................ 375/147, 375/146, 340, 346
See application file for complete search history.

(56) References Cited

U.S. PATENT DOCUMENTS

| | | | |
|---|---|---|---|
| 5,793,814 A * | 8/1998 | Baier et al. ................. | 375/285 |
| 6,072,947 A | 6/2000 | Roychowdhury et al. | |
| 6,144,711 A | 11/2000 | Raleigh et al. | |
| 6,154,443 A | 11/2000 | Huang et al. | |
| 6,177,906 B1 * | 1/2001 | Petrus ....................... | 342/378 |
| 6,798,737 B1 * | 9/2004 | Dabak et al. ............... | 370/209 |
| 6,879,578 B1 * | 4/2005 | Pan et al. ................... | 370/342 |
| 6,885,654 B1 * | 4/2005 | Pan et al. ................... | 370/342 |

FOREIGN PATENT DOCUMENTS

WO 00/77942 12/2000

OTHER PUBLICATIONS

Ramjee Prasad, Werner Mohr and Walter Konhauser editors, *Third Generation Mobile Communication Systems*, Artech House, Boston, 2000.
Anja Klein, Ghassan Kawas Kaleh and Paul Walter Baier, "Zero Forcing and Minimum Mean-Square Error Equalization for Multiuser Detection in Code-Division Multiple-Access Channels", *IEEE Trans. on Vehicular Technology*, vol. 45, No. 2, pp. 267-287, May 1996.
Naja Klein, "Data Detection Algorithms Specially Designed for the Downlink of CDMA Mobile Radio Systems", *IEEE 47th Vehicular Technology Conference*, pp. 203-207, May 1997.

(Continued)

*Primary Examiner*—Stephen Chin
*Assistant Examiner*—Jaison Joseph
(74) *Attorney, Agent, or Firm*—Volpe and Koenig, P.C.

(57) ABSTRACT

Data is to be estimated from a received plurality of data signals in a code division multiple access communication system. The data signals are transmitted in a shared spectrum at substantially a same time. A combined signal of the transmitted data signals are received over the shared spectrum and sampled. A channel response for the transmitted data signals is estimated. Data of the data signals is estimated using the samples and the estimated channel response. The data estimation uses a Fourier Transform based data estimating approach. An error in the data estimation introduced from a circulant approximation used in the Fourier Transform based approach is iteratively reduced.

21 Claims, 6 Drawing Sheets

OTHER PUBLICATIONS

H.R. Karimi and N.W. Anderson, "A Novel and Efficient Solution to Block-Based Joint-Detection using Approximate Cholesky Factorization", *Personal, Indoor and Mobile Communications PIMRC' 98*, Conference Proceedings, vol. 3, pp. 1340-1345, Sep. 1998, Boston, MA.

ETSI STC SMG2 Layer 1 Expert Group, "Low Cost MMSE-BLE-SD Algorithm for UTRA TDD Mode Downline", Tdoc SMG2 UMTS L1, Helsinki, Finland, Sep. 1998.

3G TS 25.102 V3.4.0, Oct. 2000, "*UTRA (TDD) Radio Transmission and Reception*", 3rd Generation Partnership Project, Technical Specification Group RAN WG4, Annex B., pp. 37.

Ramjee Prasad et al. *Third Generation Mobile Communication Systems*, Artech House, Boston, 2000.

Anja Klein et al, "Zero Forcing and Minimum Mean-Square Error Equalization for Multiuser Detection in Code-Division Multiple-Access Channels,"*IEEE Trans. on Vehicular Technology*, vol, 45, No. 2, pp. 276-287, May, 1996.

Ania Klein et al, "Data Detection Algorithms Specially Designed for the Downlink of CDMA Mobile Radio Systems,"*IEEE 47th Vehicular Technology Conference*, pp. 203-207, May 1997.

H.R. Karmimi et al. "A Novel and Efficient Solution to Block-Based Joint-Detection using Approximate Cholesky Factorization,"*Personal, Indoor and Mobile Communications PIMRC '98*, Conference Proceedings, vol.3, pp. 1340-1345, Sept. 1998, Boston, MA.

ETSI STC SMG2 Laver 1 Expert Group, "Low Cost MMS-BLE-SD Algorithm for UTRA TDD Mode Downline," Tdoc SMG2 UMTS L1, Heisinki, Finland, Sept. 1998.

3G TS 25.102 V3.4.0, 2000-10, "*UTRA (TDD) Radio Transmission and Reception*,"3rd Generation Partnership Project, Technical Specification Group RAN WG4, Annex B., pp.37.

Das et al., "Computationally Efficient Mulituser Detectors", Personal, Indoor and Mobile Radio Communications, IEEE, Sept. 1997, vol. 1, pp.62-67.

\* cited by examiner

ITERATIVE FAST FOURIER TRANSFORM ERROR CORRECTION

This application claims priority to U.S. Provisional Patent Application No. 60/282,387, filed on Apr. 6, 2001.

BACKGROUND

The invention generally relates to wireless communication systems. In particular, the invention relates to data detection in a wireless communication system.

Figure 1:
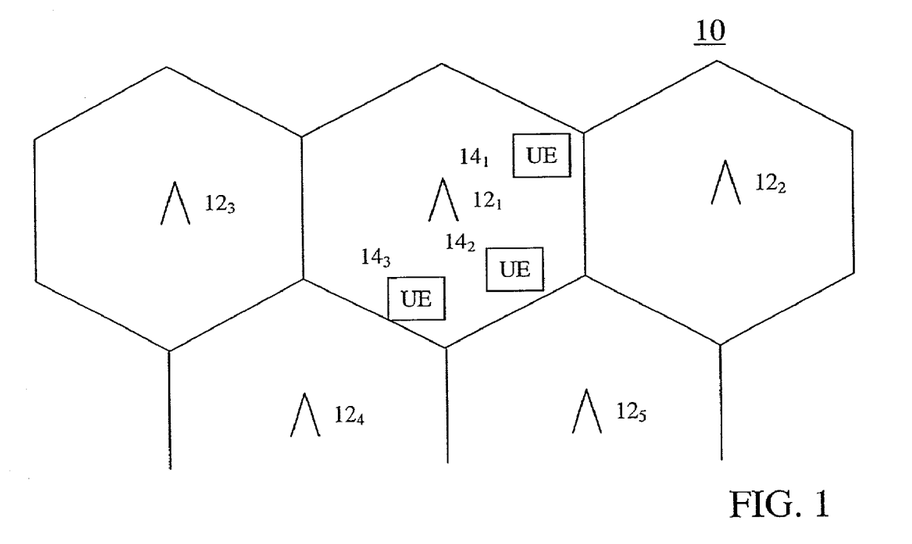
FIG. 1 is a wireless communication system.

FIG. 1 is an illustration of a wireless communication system 10. The communication system 10 has base stations $12_1$ to $12_5$ (12) which communicate with user equipments (UEs) $14_1$ to $14_3$ (14). Each base station 12 has an associated operational area, where it communicates with UEs 14 in its operational area.

In some communication systems, such as code division multiple access (CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into time slots for communication. A communication sent in such a system will have one or multiple associated codes and time slots assigned to it. The use of one code in one time slot is referred to as a resource unit.

Since multiple communications may be sent in the same frequency spectrum and at the same time, a receiver in such a system must distinguish between the multiple communications. One approach to detecting such signals is multiuser detection (MUD). In MUD, signals associated with all the UEs 14, users, are detected simultaneously. Another approach to detecting a multi-code transmission from a single transmitter is single user detection (SUD). In SUD, to recover data from the multi-code transmission at the receiver, the received signal is passed through an equalization stage and despread using the multi-codes. Approaches for implementing MUD and the equalization stage of SUD include using a Cholesky or an approximate Cholesky decomposition. These approaches have a high complexity. The high complexity leads to increased power consumption, which at the UE 14 results in reduced battery life. To reduce the complexity, Fast Fourier Transform (FFT) based approaches have been developed for MUD and SUD. In some FFT approaches, an approximation is made to facilitate the FFT implementation. This approximation results in a small error being introduced in the estimated data. Accordingly, it is desirable to have alternate approaches to detecting received data.

SUMMARY

Data is to be estimated from a received plurality of data signals in a code division multiple access communication system. The data signals are transmitted in a shared spectrum at substantially a same time. A combined signal of the transmitted data signals are received over the shared spectrum and sampled. A channel response for the transmitted data signals is estimated. Data of the data signals is estimated using the samples and the estimated channel response. The data estimation uses a Fourier Transform based data estimating approach. An error in the data estimation introduced from a circulant approximation used in the Fourier Transform based approach is iteratively reduced.

DETAILED DESCRIPTION OF THE PREFERRED EMBODIMENT(S)

Figure 2:
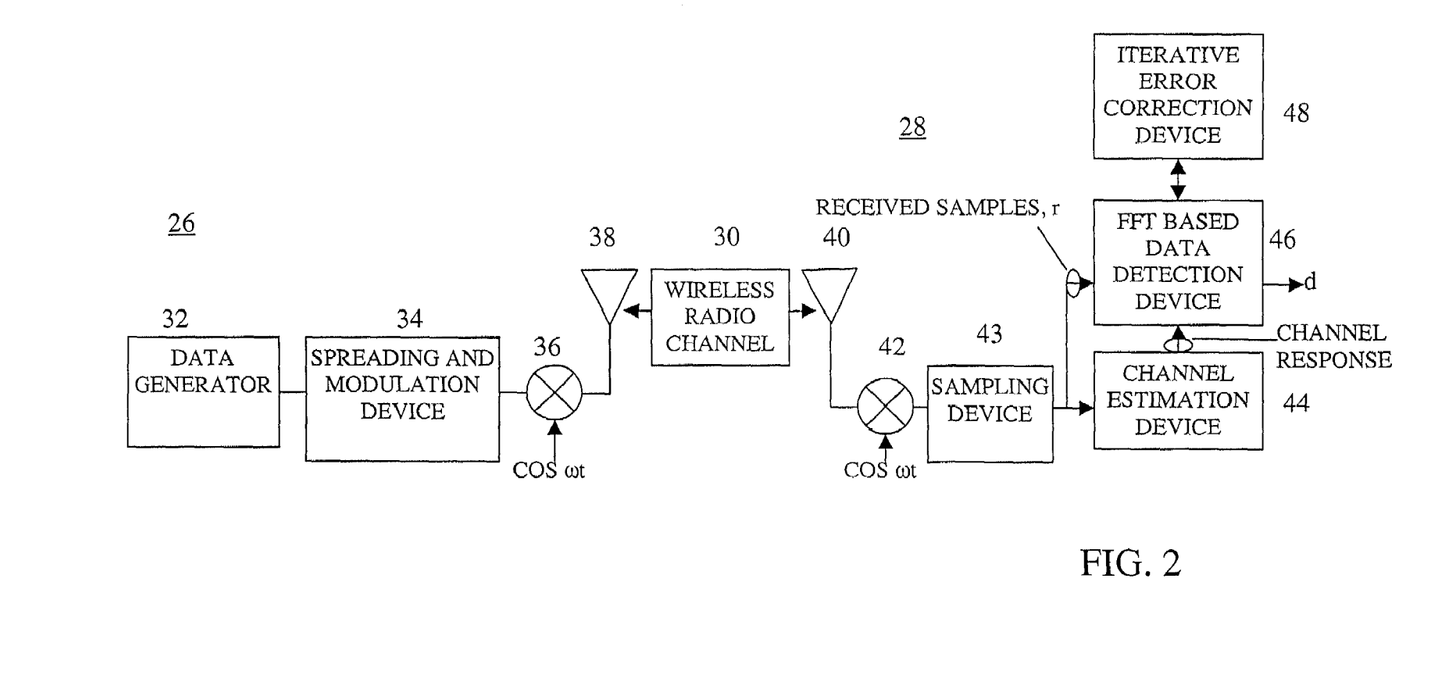
FIG. 2 is a simplified transmitter and a FFT based data detection receiver using iterative error correction.

FIG. 2 illustrates a simplified transmitter 26 and receiver 28 using a FFT based data detection with iterative error correction in a TDD/CDMA communication system, although iterative error correction is applicable to other systems, such as frequency division duplex (FDD) CDMA. In a typical system, a transmitter 26 is in each UE 14 and multiple transmitting circuits 26 sending multiple communications are in each base station 12. The iterative error correction receiver 28 may be at a base station 12, UEs 14 or both.

The transmitter 26 sends data over a wireless radio channel 30. A data generator 32 in the transmitter 26 generates data to be communicated to the receiver 28. A modulation/spreading/training device 34 spreads the data and makes the spread reference data time-multiplexed with a midamble training sequence in the appropriate assigned time slot and codes for spreading the data, producing a communication burst or bursts.

Figure 3:
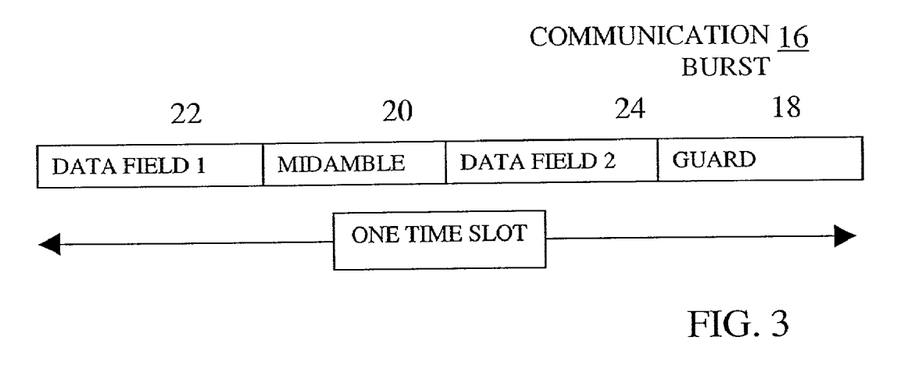
FIG. 3 is an illustration of a communication burst.

A typical communication burst 16 has a midamble 20, a guard period 18 and two data fields 22, 24, as shown in FIG. 3. The midamble 20 separates the two data fields 22, 24 and the guard period 18 separates the communication bursts to allow for the difference in arrival times of bursts transmitted from different transmitters 26. The two data fields 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or M-ary quadrature amplitude modulation (QAM).

The antenna 40 of the receiver 28 receives various radio frequency signals. The received signals are demodulated by a demodulator 42 to produce a baseband signal. The baseband signal is sampled by a sampling device 43, such as one or multiple analog to digital converters, at the chip rate or a multiple of the chip rate of the transmitted bursts. The samples are processed, such as by a channel estimation device 44 and a FFT based data detection device 46, in the time slot and with the appropriate codes assigned to the received bursts. The channel estimation device 44 uses the midamble training sequence component in the baseband samples to provide channel information, such as channel impulse responses. The channel impulse responses can be viewed as a matrix, H. The channel information and spreading codes used by the transmitter are used by the data detection device 46 to estimate the transmitted data of the received communication bursts as soft symbols. An iterative error correction device 48 processes the estimated data to correct errors resulting from the FFT based detection.

Although iterative error correction is explained using the third generation partnership project (3GPP) universal terrestrial radio access (UTRA) TDD system as the underlying communication system, it is applicable to other systems and other FFT linear equation based applications. That system is a direct sequence wideband CDMA (W-CDMA) system, where the uplink and downlink transmissions are confined to mutually exclusive time slots.

Data detection is typically modeled using a linear equation per Equation 1.

$$Z\underline{x}=\underline{y} \qquad \text{Equation 1}$$

For SUD, data detection is typically modeled per Equations 2 and 3.

$$\underline{r}=H\underline{s}+\underline{n} \qquad \text{Equation 2}$$

$$\underline{s}=C\underline{d} \qquad \text{Equation 3}$$

$\underline{r}$ is the received samples as produced by the sampling device 43. H is the channel response matrix as produced using the channel responses from the channel estimation device 44. $\underline{s}$ is the spread data vector. The spread data vector, $\underline{s}$, as per Equation 3, is a vector multiplication of the channel codes C and the originally transmitted data $\underline{d}$.

A minimum mean square error (MMSE) approach to solving Equation 1 is per Equations 4 and 5.

$$\underline{s}=(H^HH+\sigma^2I)^{-1}H^H\underline{r} \qquad \text{Equation 4}$$

$$\underline{d}=C^H\underline{s} \qquad \text{Equation 5}$$

$(\cdot)^H$ represents the complex conjugate transpose function. $\sigma^2$ is the standard deviation as determined by the channel estimation device 44. I is the identity matrix.

Equation 4 acts as the channel equalization stage and Equation 5 as the despreading. A cross channel correlation matrix is defined per Equation 6.

$$R=H^HH+\sigma^2I \qquad \text{Equation 6}$$

The linear equation required to be solved is per Equation 7.

$$R\underline{s}=\underline{y} \qquad \text{Equation 7}$$

$\underline{y}$ is per Equation 8.

$$\underline{y}=H^H\underline{r} \qquad \text{Equation 8}$$

Although R is not circulant for a multiple of the chip rate sampling, a portion of R is circulant. The circulant portion is derived by eliminating the bottom and top W rows. W is the length of the channel impulse response. By approximating R as a circulant matrix, $R_{cir}$, $R_{cir}$ is decomposable through Fourier Transforms, such as per Equation 9.

$$R_{cir}=D_D^{-1}\Lambda D_P=\frac{1}{P}D_P^*\Lambda D_P \qquad \text{Equation 9}$$

Using a column of the R matrix to approximate a circulant version of R, the spread data vector can be determined such as per Equation 10.

$$F(\underline{s})=\frac{F((H)_1)\cdot F(\underline{r})}{F((R)_1)} \qquad \text{Equation 10}$$

$(R)_1$ is the first column of R and $(H)_1$ is the first column of H, although any column can be used by permuting that column. Preferably, a column at least W columns from the left and right are used, since these columns have more non-zero elements.

For MUD, data detection is typically modeled per Equation 11.

$$\underline{r}=A\underline{d}+\underline{n} \qquad \text{Equation 11}$$

A is the symbol response matrix. The symbol response matrix is produced by multiplying the channel codes of the transmitted bursts with each burst's channel response.

A MMSE approach to solving Equation 11 is per Equations 12 and 13.

$$\underline{d}=(A^HA+\sigma^2I)^{-1}A^H\underline{r} \qquad \text{Equation 12}$$

$$R=A^HA+\sigma^2I \qquad \text{Equation 13}$$

R is referred to as the cross correlation matrix.

The linear equation to be solved is per Equation 14.

$$\underline{d}=R^{-1}\underline{y} \qquad \text{Equation 14}$$

$\underline{y}$ is per Equation 15.

$$\underline{y}=A^H\underline{r} \qquad \text{Equation 15}$$

If the elements of R are grouped into K by K blocks, the structure of R is approximately block-circulant. K is the number of bursts that arrive simultaneously. The K bursts are superimposed on top of each other in one observation interval. For the 3GPP UTRA TDD system, each data field of a time slot corresponds to one observation interval. Using a block circulant approximation of R, $R_{bcir}$, $R_{bcir}$ is decomposable through block-Fourier transforms, such as per Equation 16.

$$R_{bcir}=D_P^{-1}\Lambda D_P=\frac{1}{P}D_P^*\Lambda D_P \qquad \text{Equation 16}$$

$D_P$ is per Equation 17.

$$D_P=D_N\otimes I_K, P=K\cdot N_S \qquad \text{Equation 17}$$

$D_N$ is the N-point FFT matrix and $I_K$ is the identity matrix of size K. $\otimes$ represents the kronecker product. $N_S$ is the number of data symbols in a data field. $\Lambda$ is a block-diagonal matrix. The blocks of $\Lambda$ are $D_PR_{cir}(:,1:K)$. As a result, $\Lambda$ is per Equation 18.

$$\Lambda=\text{diag}(D_PR(:,1:K)) \qquad \text{Equation 18}$$

Using FFTs, the data vector, $\underline{d}$, is determined per Equation 19.

$$F(\underline{d})=\Lambda^{-1}F(A^H\underline{r}) \qquad \text{Equation 19}$$

As a result, the FFT of $\underline{d}$ is determined. The data is estimated by taking the inverse FFT of $\underline{d}$.

To improve on the accuracy, the dimension of R may be extended to include the impulse response of the last symbol. This last symbol's impulse response extends into either the midamble or guard period. To capture the last symbol's response, the block-circulant structure of R is extended another W−1 chips. W is the length of the impulse response. The same FFT approach is performed by using the extended R matrix and extended r by using information from the midamble (after midamble cancellation) or the guard period.

If a prime factor algorithm (PFA) FFT is used, the R matrix may be extended so that the most efficient PFA of length z is used. The R matrix is similarly expanded to length z using the midamble or guard period information.

Although iterative error correction is explained in conjunction with specific implementations of SUD and MUD, it is applicable to any FFT based solution to a linear equation, which uses a circulant approximation, as generally described as follows.

Equation 1 is a general linear equation.

$$Z\underline{x}=\underline{y} \qquad \text{Equation 1}$$

To determine $\underline{x}$, Equation 20 can be used.

$$\underline{x}=Z^{-1}\underline{y} \qquad \text{Equation 20}$$

Inverting matrix Z is complex. By approximating Z as a circulant matrix, $Z_{cir}$, Z is determinable by FFT decomposition per Equations 21 or 22.

$$Z_{cir} = D_P^{-1} \Lambda D_P = \frac{1}{P} D_P^* \Lambda D_P \qquad \text{Equation 21}$$

$$Z_{cir}^{-1} = D_P^{-1} \Lambda D_P = \frac{1}{P} D_P^* \Lambda^{-1} D_P \qquad \text{Equation 22}$$

If Z is a block-circulant matrix, a Block-Fourier Transform is used instead, which uses equations analogous to Equations 21 and 22.

The circulant approximation of Z creates an approximation error. The difference between Z and $Z_{cir}$ is per Equation 23.

$$Z = Z_{cir} - \Delta_Z \qquad \text{Equation 23}$$

$\Delta_Z$ is the differential matrix between Z and $Z_{cir}$. Using the circulant and differential matrix, Equation 1 becomes Equation 24.

$$(Z_{cir} - \Delta_Z)\underline{x} = \underline{y} \qquad \text{Equation 24}$$

By rearranging Equation 24, Equation 25 results.

$$\underline{x} = Z_{cir}^{-1}\underline{y} + Z_{cir}^{-1}\Delta_Z\underline{x} \qquad \text{Equation 25}$$

An iterative approach can be used to solve Equation 25, per Equation 26, 27 and 28.

$$\underline{x}^{(k)} = \underline{x}^{(k-1)} + \Delta_x^{(k-1)} \qquad \text{Equation 26}$$

$$\underline{x}^{(k-1)} = Z_{cir}^{-1}\underline{y} \qquad \text{Equation 27}$$

$$\Delta_x^{(k-1)} = Z_{cir}^{-1}\Delta_Z\underline{x}^{(k-1)} \qquad \text{Equation 28}$$

Using Equations 26, 27 and 28, $\underline{x}$ is solved as follows. An initial solution of $\underline{x}$, $\underline{x}^{(0)}$, is determined using FFTs of Equation 21 or 22 and the circulant approximation, as illustrated by Equation 29.

$$\underline{x}^{(0)} = Z_{cir}^{-1}\underline{y} \qquad \text{Equation 29}$$

An initial error correction term, $\Delta_x^{(0)}$, is determined using Equation 30.

$$\Delta_x^{(0)} = Z_{cir}^{-1}\Delta_Z\underline{x}^{(0)} \qquad \text{Equation 30}$$

The initial error correction term, $$\Delta_x^{(0)},$$

is added to the initial solution, $\underline{x}^{(0)}$, per Equation 31.

$$\underline{x}^{(1)} = \underline{x}^{(0)} + \Delta_x^{(0)} \qquad \text{Equation 31}$$

Iterations are repeated N times per Equations 32 and 33.

$$\Delta_x^{(k)} = Z_{cir}^{-1}\Delta_Z\underline{x}^{(k)} \qquad \text{Equation 32}$$

$$\underline{x}^{(k+1)} = \underline{x}^{(k)} + \Delta_x^{(k)}, k = 1, 2, \ldots, N-1 \qquad \text{Equation 33}$$

$\underline{x}^{(N)}$ used as the estimate for $\underline{x}$. The number of iterations, N, may be a fixed number based on a trade-off between added complexity due to the iterative error correction process and increased accuracy in the $\underline{x}$ determination. The number of iterations, N, may not be fixed. The iterations may continue until $\underline{x}^{(k+1)}$ and $\underline{x}^{(k)}$ are the same value (the solution converges) or their difference is below a threshold, such as per Equations 34 and 35, respectively.

$$\underline{x}^{(k+1)} - \underline{x}^{(k)} = 0 \qquad \text{Equation 34}$$

$$\underline{x}^{(k+1)} - \underline{x}^{(k)} < T \qquad \text{Equation 35}$$

T is the threshold value.

One of the advantages to iterative error correction is that it is optional. The initial solution, $\underline{x}^{(0)}$, is the same estimation of $\underline{x}$ as would result without any error correction. As a result, if additional precision in the $\underline{x}$ determination is not necessary, iterative error correction is not performed and the additional complexity of iterative error correction is avoided. However, if additional precision is necessary or desired, iterative error correction is performed at the expense of added complexity. Accordingly, iterative error correction provides an adaptable tradeoff between accuracy and complexity. Furthermore, since iterative error correction is performed only using matrix multiplications, additions and subtractions, the added complexity of iterative correction is relatively small.

Applying iterative error correction to a MMSE solution for SUD, the linear equation being solved is per Equation 36.

$$R\underline{s} = \underline{y} \qquad \text{Equation 36}$$

$\underline{y}$ and R are per Equations 37 and 13, respectively.

$$\underline{y} = H^H \underline{r} \quad \text{Equation 37}$$

$$R = H^H H + \sigma^2 I \quad \text{Equation 13}$$

In relating Equation 36 to Equation 1, R corresponds to Z, $\underline{s}$ corresponds to $\underline{x}$ and $\underline{y}$ corresponds to y.

Using a circulant approximation for R, $R_{cir}$, iterative error correction is performed as follows. An initial spread data estimate, $\underline{s}^{(0)}$, is determined using FFTs, as illustrated by Equation 38.

$$\underline{s}^{(0)} = R_{cir}^{-1} \underline{y} \quad \text{Equation 38}$$

An initial error correction term, $$\Delta_s^{(0)},$$

is determined using Equation 39.

$$\Delta_s^{(0)} = R_{cir}^{-1} \Delta_R \underline{s}^{(0)} \quad \text{Equation 39}$$

$\Delta_R$ is the difference between R and $R_{cir}$. The initial error correction term, $$\Delta_s^{(0)},$$

is added to the initial solution, $\underline{s}^{(0)}$, per Equation 40.

$$\underline{s}^{(1)} = \underline{s}^{(0)} + \Delta_s^{(0)} \quad \text{Equation 40}$$

Iterations are repeated N times per Equations 41 and 42.

$$\Delta_s^{(k)} = R_{cir}^{-1} \Delta_R \underline{s}^{(k)} \quad \text{Equation 41}$$

$$\underline{s}^{(k+1)} \underline{s}^{(k)} + \Delta_s^{(k)}, k = 1, 2, \ldots, N-1 \quad \text{Equation 42}$$

The data symbols are determined using the $N^{th}$ iterations estimated spread data vector, $\underline{s}^{(N)}$, by despreading using the channel codes of the transmitted bursts as illustrated in Equation 43.

$$\underline{d} = C^H \underline{s}^{(N)} \quad \text{Equation 43}$$

Applying iterative error correction to a MMSE solution for MUD, the linear equation being solved is per Equation 44.

$$R \underline{d} = \underline{y} \quad \text{Equation 44}$$

y and R are per Equations 45 and 46, respectively.

$$\underline{y} = A^H \underline{r} \quad \text{Equation 45}$$

$$R = A^H A + \sigma^2 I \quad \text{Equation 46}$$

In relating Equation 44 to Equation 1, R corresponds to Z, $\underline{d}$ corresponds to $\underline{x}$ and $\underline{y}$ corresponds to y.

Using the block circulant approximation for R, $R_{bcir}$, iterative error correction is performed as follows. An initial data estimate, $d^{(0)}$, is determined using FFTs, as illustrated by Equation 47.

$$\underline{d}^{(0)} = R_{bcir}^{-1} \underline{y} \quad \text{Equation 47}$$

An initial error correction term, $$\Delta_R^{(0)},$$

is determined using Equation 48.

$$\Delta_R^{(0)} = R_{bcir}^{-1} \Delta_R \underline{d}^{(0)} \quad \text{Equation 48}$$

$\Delta_R$ is the difference between R and $R_{bcip}$. The initial error correction term, $$\Delta_d^{(0)},$$

is added to the initial solution, $\underline{d}^{(0)}$, per Equation 49.

$$\underline{d}^{(1)} = \underline{d}^{(0)} + \Delta_d^{(0)} \quad \text{Equation 49}$$

Iterations are repeated N times per Equations 50 and 51.

$$\Delta_d^{(k)} = R_{bcir}^{-1} \Delta_R \underline{d}^{(k)} \quad \text{Equation 50}$$

$$\underline{d}^{(k+1)} = \underline{d}^{(k)} + \Delta_d^{(k)}, k = 1, 2, \ldots N \quad \text{Equation 51}$$

The estimated data symbols is the $N^{th}$ iterations estimated data symbols, $\underline{d}^{(N)}$. An analogous approach is also used if the R matrix is extended to capture the last symbols impulse response or extended to an efficient PFA length.

What is claimed is:

1. A method for estimating data received from a plurality of data signals in a code division multiple access communication system, the data signals transmitted in a shared spectrum at substantially a same time, the method comprising:
   receiving and sampling a combined signal of the transmitted data signals over the shared spectrum;
   estimating a channel response for the transmitted data signals; and
   estimating data of the data signals using the samples, the estimated channel response and a Fourier Transform based data estimation approach and iteratively reducing an error in the data estimation introduced from a circulant approximation used in the Fourier Transform based approach.

2. The method of claim 1 wherein the Fourier Transform based data estimation approach is a Fast Fourier Transform based data estimation approach.

3. The method of claim 1 wherein the Fourier Transform based data estimation approach uses a single user detection based data estimation approach.

4. The method of claim 1 wherein the Fourier Transform based data estimation approach uses a multiuser detection based data estimation approach.

5. A receiver for use in a code division multiple access communication system, the receiver comprising:
an antenna for receiving a combined signal of transmitted data signals, the transmitted data signals transmitted in a shared spectrum at substantially a same time;
a sampling device for estimating a channel response for the transmitted data signals;
a data estimation device for estimating data of the transmitted data signals using the samples, the estimated channel response and a Fourier Transform based data estimation approach; and
an error correction device for reducing an error in the data estimation introduced from a circulant approximation in the Fourier Transform based data estimation approach.

6. The receiver of claim 5 wherein the Fourier Transform based data estimation approach is a Fast Fourier Transform based data estimation approach.

7. The receiver of claim 5 wherein the error correction device iteratively reduces the error in the data estimation.

8. The receiver of claim 5 wherein the error correction device is selectively utilized to reduce the error in the data estimation.

9. The receiver of claim 5 wherein the error correction device reduces the error by determining an error correction term using a difference between an unapproximated matrix and a circulant approximated matrix used by the data estimation device and a first estimate output by the data estimation device, and adding the error correction term to the first estimate as a next estimate.

10. The receiver of claim 9 wherein the error correction device iteratively produces subsequent estimates using the next estimate.

11. The receiver of claim 10 wherein the iteratively producing subsequent estimates is performed a fixed number of times.

12. The receiver of claim 10 wherein the iteratively producing subsequent estimates is performed until a difference between a last two of the subsequent estimates is a 0 vector.

13. The receiver of claim 10 wherein the iteratively producing subsequent estimates is performed until a difference between a last two of the subsequent estimates is less than a threshold value.

14. A receiver for use in a code division multiple access communication system, the receiver comprising:
means for receiving a combined signal of transmitted data signals, the transmitted data signals transmitted in a shared spectrum at substantially a same time;
means for estimating a channel response for the transmitted data signals;
means for estimating data of the transmitted data signals using the samples, the estimated channel response and a Fourier Transform based data estimation approach; and
means for reducing an error in the data estimation introduced from a circulant approximation in the Fourier Transform based data estimation approach.

15. The receiver of claim 14 wherein the Fourier Transform based data estimation approach is a Fast Fourier Transform based data estimation approach.

16. The receiver of claim 14 wherein the error reducing means iteratively reduces the error in the data estimation.

17. The receiver of claim 14 wherein the error reducing means reduces the error by determining an error correction term using a difference between an unapproximated matrix and a circulant approximated matrix used by the data estimation device and a first estimate output by the data estimation device, and adding the error correction term to the first estimate as a next estimate.

18. The receiver of claim 17 wherein the error reducing means iteratively produces subsequent estimates using the next estimate.

19. The receiver of claim 18 wherein the iteratively producing subsequent estimates is performed a fixed number of times.

20. The receiver of claim 18 wherein the iteratively producing subsequent estimates is performed until a difference between a last two of the subsequent estimates is a 0 vector.

21. The receiver of claim 18 wherein the iteratively producing subsequent estimates is performed until a difference between a last two of the subsequent estimates is less than a threshold.

* * * * *

UNITED STATES PATENT AND TRADEMARK OFFICE
CERTIFICATE OF CORRECTION

| | |
|---|---|
| PATENT NO. | : 7,027,489 B2 |
| APPLICATION NO. | : 10/004370 |
| DATED | : April 11, 2006 |
| INVENTOR(S) | : Pan et al. |

It is certified that error appears in the above-identified patent and that said Letters Patent is hereby corrected as shown below:

ON THE TITLE PAGE

At section (56), OTHER PUBLICATIONS, page 1, right column, line 8, after "No. 2. pp.", delete "267-287" and insert therefor --276-287--.

At section (56), OTHER PUBLICATIONS, page 1, right column, line 9, before the word "Klein", delete "Naja" and insert therefor --Anja--.

At section (56), OTHER PUBLICATIONS, page 2, right column, line 1, before the word "Klein", delete "Ania" and insert therefor --Anja--.

At section (56), OTHER PUBLICATIONS, page 2, right column, line 5, after "H.R.", delete "Karmimi" and insert therefor --Karimi--.

At section (56), OTHER PUBLICATIONS, page 2, right column, line 10, after "SMG2", delete "Laver" and insert therefor --Layer--.

At section (56), OTHER PUBLICATIONS, page 2, right column, line 12, before the word "Finland", delete "Heisinki" and insert therefor --Helsinki--.

IN THE ABSTRACT

At section (57), ABSTRACT, page 1, right column, line 4, after the word "substantially", delete "a" and insert therefor --the--.

UNITED STATES PATENT AND TRADEMARK OFFICE
CERTIFICATE OF CORRECTION

| | |
|---|---|
| PATENT NO. | : 7,027,489 B2 |
| APPLICATION NO. | : 10/004370 |
| DATED | : April 11, 2006 |
| INVENTOR(S) | : Pan et al. |

It is certified that error appears in the above-identified patent and that said Letters Patent is hereby corrected as shown below:

IN THE DRAWINGS

Figure 4:
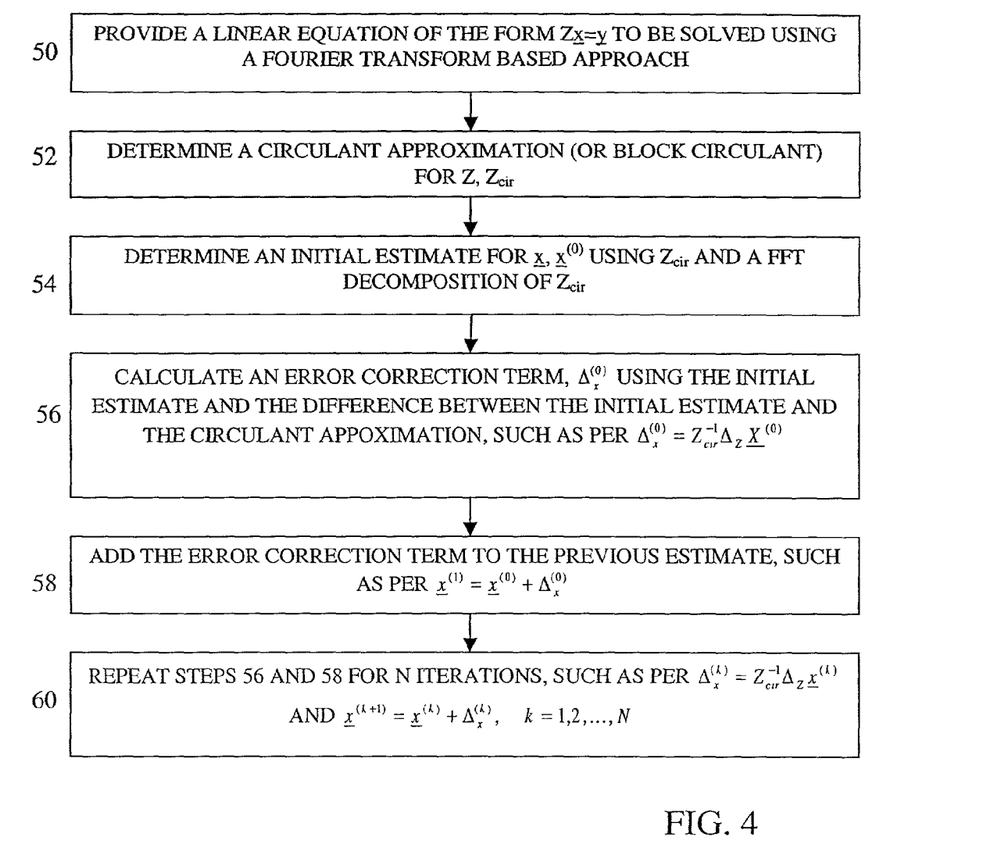
FIG. 4 is a flow chart of iterative error correction.
Figure 5:
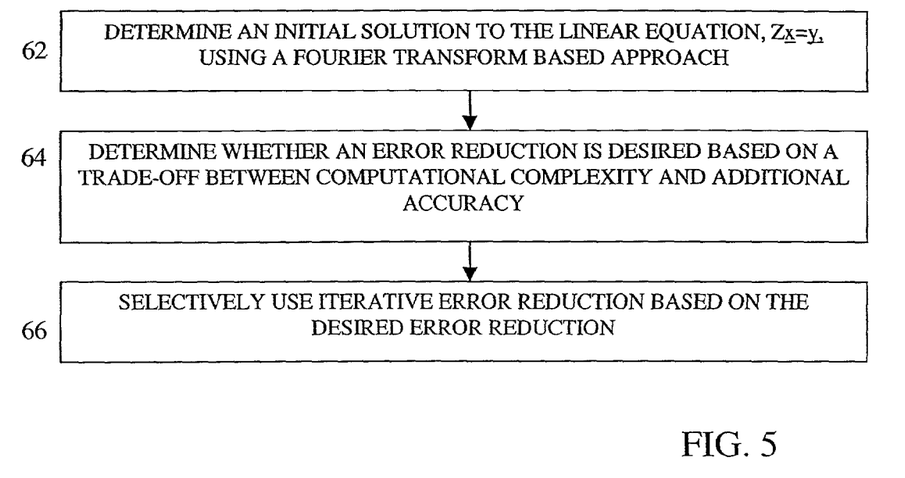
FIG. 5 is a flow chart of a receiver selectively using iterative error correction.

At FIG. 4, item 54, line 1, after the word "AND", delete "A" and insert therefor --AN--.

At FIG. 4, item 56, line 3, after the word "CIRCULANT", delete "APPOXIMATION" and insert therefor --APPROXIMATION--.

Figure 6:
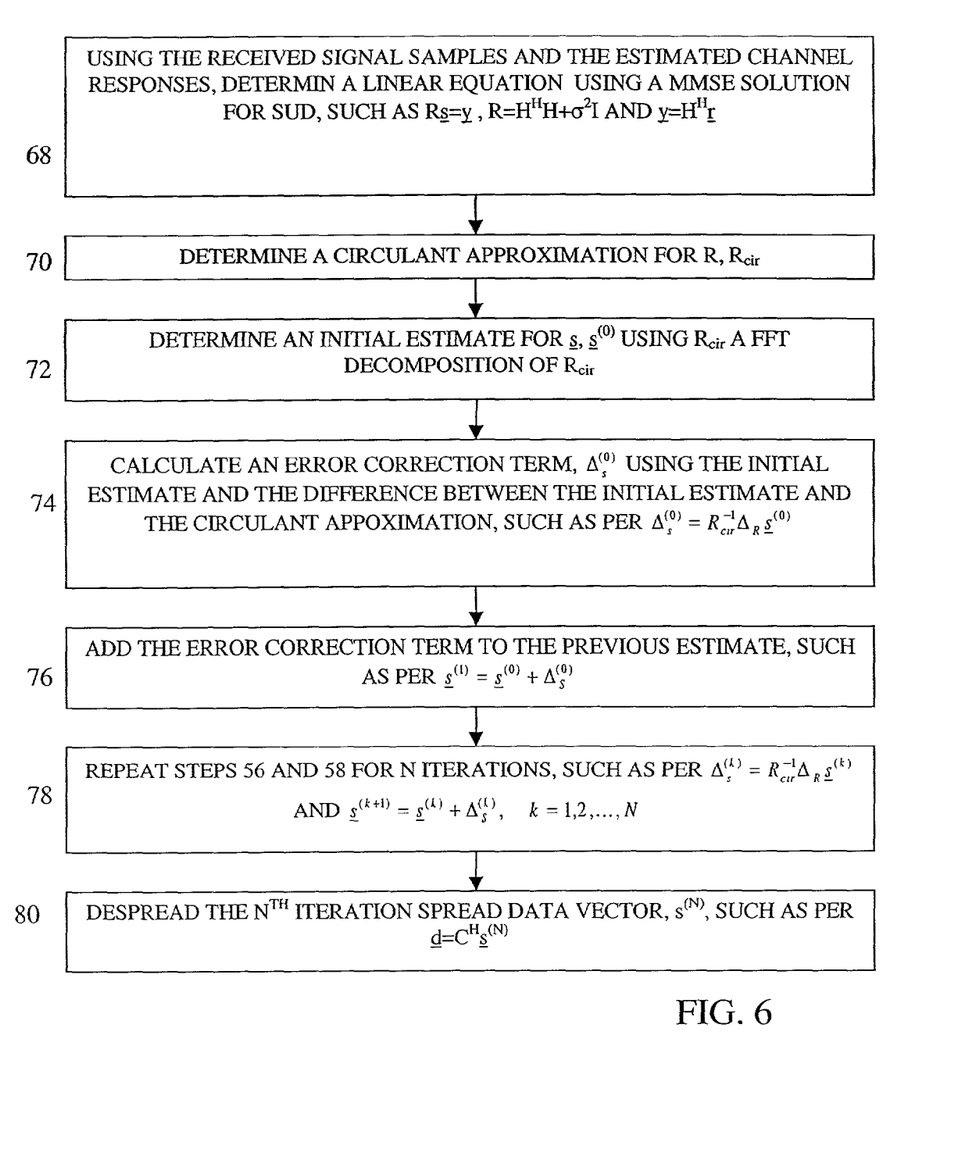
FIG. 6 is a flow chart of an example of a FFT based SUD using iterative error correction.

At FIG. 6, item 68, line 2, after the word "RESPONSES,", delete "DETERMIN" and insert therefor --DETERMINE--.

At FIG. 6, item 68, line 2, after the word "USING", delete "A" and insert therefor --AN--.

At FIG. 6, item 72, line 1, after "$R_{cir}$", delete "A" and insert therefor --AN--.

At FIG. 6, item 74, line 3, after the word "CIRCULANT", delete "APPOXIMATION" and insert therefor --APPROXIMATION--.

Figure 7:
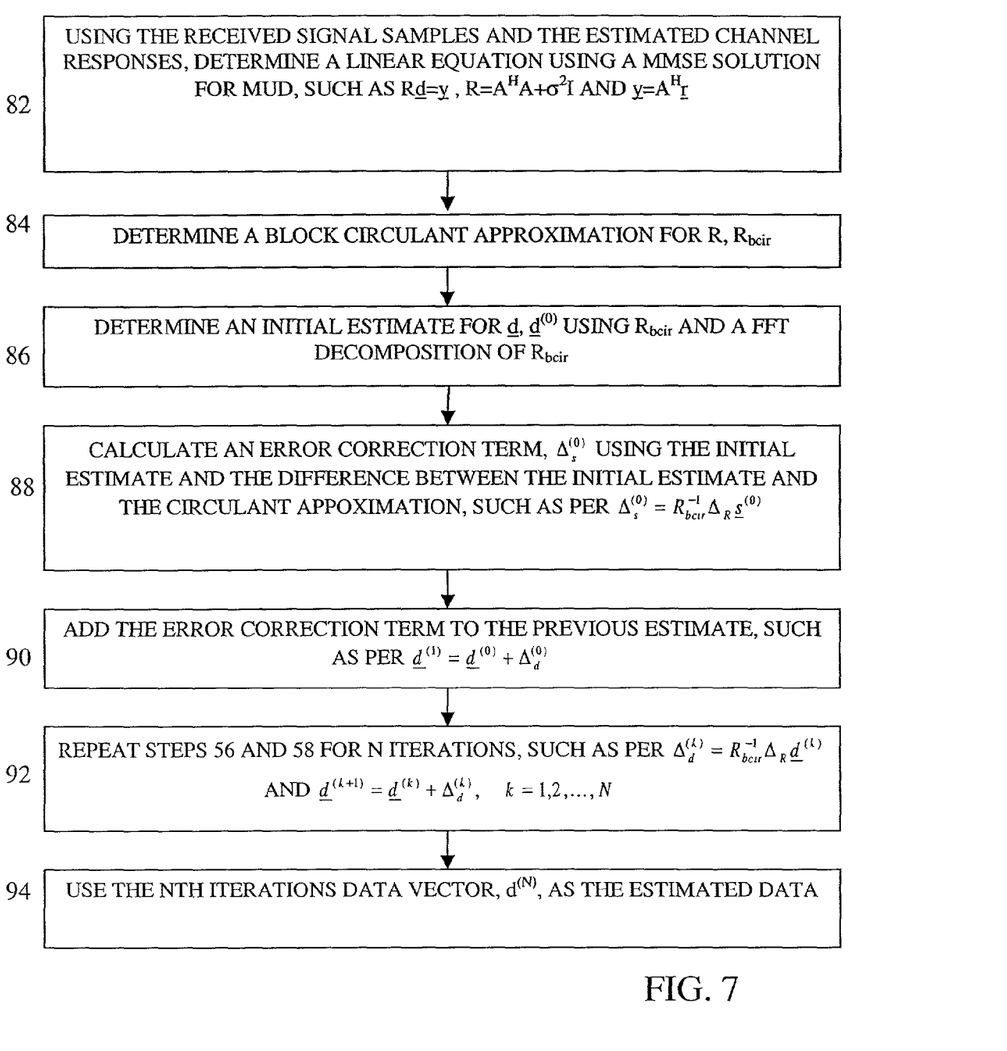
FIG. 7 is a flow chart of an example of a FFT based MUD using iterative error correction.

At FIG. 7, item 82, line 2, after the word "USING", delete "A" and insert therefor --AN--.

At FIG. 7, item 86, line 1, after the word "AND", delete "A" and insert therefor --AN--.

At FIG. 7, item 88, line 3, after the word "CIRCULANT", delete "APPOXIMATION" and insert therefor --APPROXIMATION--.

UNITED STATES PATENT AND TRADEMARK OFFICE
CERTIFICATE OF CORRECTION

PATENT NO.      : 7,027,489 B2
APPLICATION NO. : 10/004370
DATED           : April 11, 2006
INVENTOR(S)     : Pan et al.

It is certified that error appears in the above-identified patent and that said Letters Patent is hereby corrected as shown below:

IN THE SPECIFICATION

At column 1, line 59, after the word "substantially", delete "a" and insert therefor --the--.

At column 2, line 4, before "FFT", delete "a" and insert therefor --an--.

At column 2, line 10, before "FFT", delete "a" and insert therefor --an--.

At column 2, line 12, before "FFT", delete "a" and insert therefor --an--.

At column 2, line 58, before "FFT", delete "a" and insert therefor --an--.

At column 3, line 24, after the word "received", delete "samples" and insert therefor --sample--.

At column 4, line 19, before "MMSE", delete "A" and insert therefor --An--.

At column 4, line 61, delete Equation 19, and insert therefor --$F(d) = \Lambda^{-1} F(A^H \underline{r})$--.

At column 6, line 35, before the word "used", insert --is--.

At column 6, line 63, before "MMSE", delete "a" and insert therefor --an--.

At column 7, line 1, delete Equation 37, and insert therefor --$\underline{y} = H^H \underline{r}$--.

UNITED STATES PATENT AND TRADEMARK OFFICE
CERTIFICATE OF CORRECTION

PATENT NO. : 7,027,489 B2
APPLICATION NO. : 10/004370
DATED : April 11, 2006
INVENTOR(S) : Pan et al.

It is certified that error appears in the above-identified patent and that said Letters Patent is hereby corrected as shown below:

At column 7, line 46, delete Equation 42, and insert therefor

--$\underline{s}^{(k+1)} = \underline{s}^{(k)} + \Delta_s^{(k)}$, k=1, 2, ... , N-1--.

At column 7, line 55, before "MMSE", delete "a" and insert therefor --an--.

At column 7, line 60, before the words "and R", delete "y" and install therefor --$\underline{y}$--.

At column 8, line 22, after the words "R and", delete "$R_{bcip}$" and insert therefor --$R_{bcir}$--.

At column 8, line 45, after the words "the last", delete "symbols" and insert therefor --symbol's--.

IN THE CLAIMS

Column 8, line 53, after the word "substantially", delete "a" and insert therefor --the--.

Column 9, line 11, after the word "substantially", delete "a" and insert therefor --the--.

Column 9, line 41, after the word "estimates", delete "is" and insert therefor --are--.

Column 9, line 44, after the word "estimates", delete "is" and insert therefor --are--.

Column 10, line 2, after the word "estimates", delete "is" and insert therefor --are--.

Column 10, line 9, after the word "substantially", delete "a" and insert therefor --the--.

Column 10, line 35, after the word "estimates", delete "is" and insert therefor --are--.

UNITED STATES PATENT AND TRADEMARK OFFICE
CERTIFICATE OF CORRECTION

PATENT NO. : 7,027,489 B2
APPLICATION NO. : 10/004370
DATED : April 11, 2006
INVENTOR(S) : Pan et al.

It is certified that error appears in the above-identified patent and that said Letters Patent is hereby corrected as shown below:

Column 10, line 38, after the word "estimates", delete "is" and insert therefor --are--.

Column 10, line 42, after the word "estimates", delete "is" and insert therefor --are--.

Signed and Sealed this

Twentieth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,027,489 B2 | Page 1 of 1 |
| APPLICATION NO. | : 10/004370 | |
| DATED | : April 11, 2006 | |
| INVENTOR(S) | : Pan et al. | |

It is certified that error appears in the above-identified patent and that said Letters Patent is hereby corrected as shown below:

IN THE CLAIMS

At claim 1, column 8, line 53, after the word "substantially", delete "a" and insert therefor --the--.

Signed and Sealed this

Sixth Day of May, 2008

JON W. DUDAS
*Director of the United States Patent and Trademark Office*